United States Patent
Jeong

(10) Patent No.: US 6,701,263 B2
(45) Date of Patent: Mar. 2, 2004

(54) METHOD AND APPARATUS FOR DISPLAYING ELECTRIC POWER ELEMENTS FOR VIDEO DISPLAY APPLIANCE

(75) Inventor: Seok Hwa Jeong, Kyungsangbuk-Do (KR)

(73) Assignee: LG Electronics Inc., Seoul (KR)

( * ) Notice: Subject to any disclaimer, the term of this patent is extended or adjusted under 35 U.S.C. 154(b) by 6 days.

(21) Appl. No.: 09/942,771

(22) Filed: Aug. 31, 2001

(65) Prior Publication Data

US 2002/0049550 A1 Apr. 25, 2002

(30) Foreign Application Priority Data

Sep. 1, 2000 (KR) ........................................ 2000-51665

(51) Int. Cl.⁷ .......................... G06F 19/00; G01R 21/00; G01R 21/06
(52) U.S. Cl. ........................... 702/60; 315/406; 345/25; 345/63; 702/61
(58) Field of Search .............................. 702/60, 61, 67; 345/20, 63, 67, 156, 25; 348/673, 679, 686, 600; 315/406

(56) References Cited

U.S. PATENT DOCUMENTS 3,866,210 A * 2/1975 Lokerson et al. ............. 345/25
5,745,085 A * 4/1998 Tomio et al. .................. 345/63
6,495,979 B2 * 12/2002 Park et al. .................... 315/406

OTHER PUBLICATIONS

Kinjo, "Image display appratus and image display method", Pub. No.: US 2002/0015019 A1 , Pub. Date: Feb. 7, 2002.*

* cited by examiner

Primary Examiner—John Barlow
Assistant Examiner—John Le
(74) Attorney, Agent, or Firm—Jacobson Holman PLLC

(57) ABSTRACT

A method and apparatus for displaying electric power elements for a video display appliance that can compute a voltage and current actually applied to the appliance and power consumption computed therefrom, and display them on a screen. The apparatus includes, a key input section for a user's selection of a display command and display items of the electric power elements, a detecting section for detecting a voltage and current supplied from a power supply section, an operational processing section for converting the voltage and current into the power consumption in response to a control signal received from a control section, an OSD generating section and a display section for processing and displaying by an OSD the voltage, current, and power consumption on a predetermined region of the screen. The respective electric power elements in the standard state and in the present state can be displayed on the screen selectively and together, and thus the characteristics and power supply state of the appliance can be more conveniently confirmed.

7 Claims, 2 Drawing Sheets

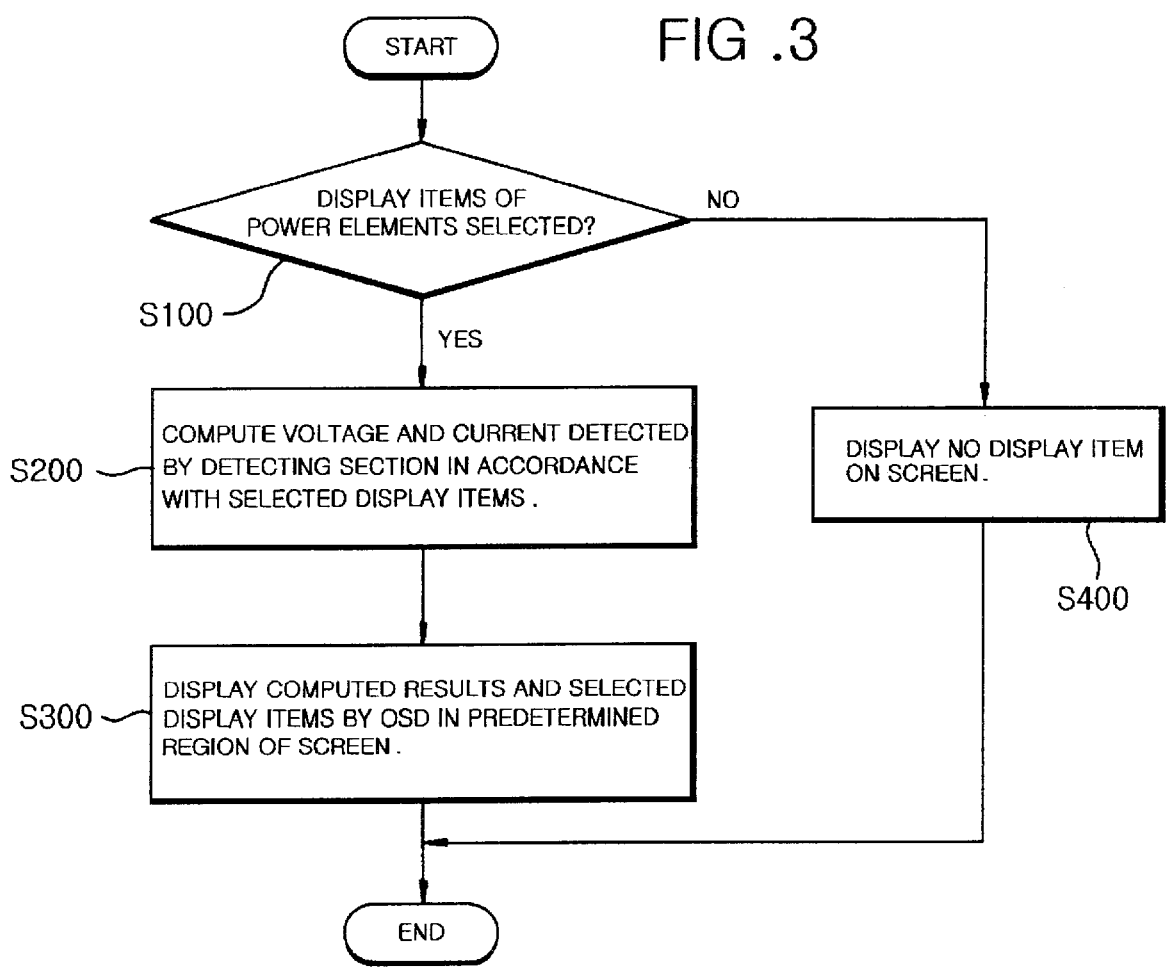

METHOD AND APPARATUS FOR DISPLAYING ELECTRIC POWER ELEMENTS FOR VIDEO DISPLAY APPLIANCE

BACKGROUND OF THE INVENTION

1. Field of the Invention

The present invention relates generally to a video display appliance, and more particularly to a method and apparatus for displaying electric power elements for a video display appliance.

2. Description of the Related Art

Generally, the video display appliance is an appliance that processes a video signal of a video mode such as SVGA (800×600), XGA (1024×768), SXGA (1280×1024), etc., transmitted from a personal computer (PC) or a video card of a workstation, and displays the video signal on a screen.

According to a conventional video display appliance, electric power elements such as voltage, current, and power consumption of the corresponding video display appliance in a standard state are printed on a name plate attached to a rear surface of the corresponding appliance.

That is, the name plate indicates the voltage, current, and power consumption used in the standard state of the video display appliance, and a user can grasp the characteristics of the corresponding product with reference to the voltage, current, and power consumption printed on the name plate.

The display of the power elements according to the conventional video display appliance, however, has the following drawbacks.

First, it is impossible to grasp actual power consumption according to the variation of actually applied voltage and current.

Second, in order for the user to grasp the voltage, current, and power consumption of the video display appliance in the standard state, the user should directly confirm the name plate attached to the rear surface of the corresponding product, and this troubles the user.

SUMMARY OF THE INVENTION

It is an object of the present invention to solve the problems involved in the related art, and to provide a method and apparatus for displaying electric power elements for a video display appliance that can compute a power consumption according to variation of a voltage and current actually applied to the video display appliance in addition to a power consumption when the video display appliance is in the standard state, and display them on a screen.

To achieve the above object, there is provided an apparatus for displaying electric power elements for a video display appliance comprising a power supply section for supplying a power, a key input section for a user's selection of a display command and display items of the electric power elements, a detecting section for detecting a voltage and current supplied from the power supply section, an analog-to-digital (A/D) converter for converting the voltage and current detected by the detecting section into digital signals, an operational processing section for converting the voltage and current converted by the A/D converter into a power consumption to output the converted voltage, current, and power consumption, a control section for outputting a control signal to the operational processing section so that the voltage and current converted by the A/D converter are converted into the power consumption, an on-screen display (OSD) generating section for processing the power consumption converted by the operational processing section in the form of an OSD to display the power consumption by the OSD, and a display section for displaying the power consumption in the form of the OSD outputted from the OSD generating section on a predetermined region of the screen.

In another aspect of the present invention, there is provided a method of displaying electric power elements for a video display appliance comprising the steps of receiving a user's key input for selecting a display command and display items of the electric power elements to be displayed on a screen, detecting a voltage and current supplied to the video display appliance, processing the detected voltage and current to match the display items selected by the user, and displaying the display items according to a result of processing on a predetermined region of the screen by an on-screen display (OSD).

BRIEF DESCRIPTION OF THE DRAWINGS

The above and other objects, features and advantages of the present invention will become more apparent from the following detailed description when taken in conjunction with the accompanying drawings, in which:

FIG. 3 is a flowchart illustrating a method of displaying electric power elements for a video display appliance according to the present invention.

DETAILED DESCRIPTION OF THE PREFERRED EMBODIMENT

A method and apparatus for displaying electric power elements for a video display appliance according to a preferred embodiment of the present invention will be described herein below with reference to the accompanying drawings.

Figure 1:
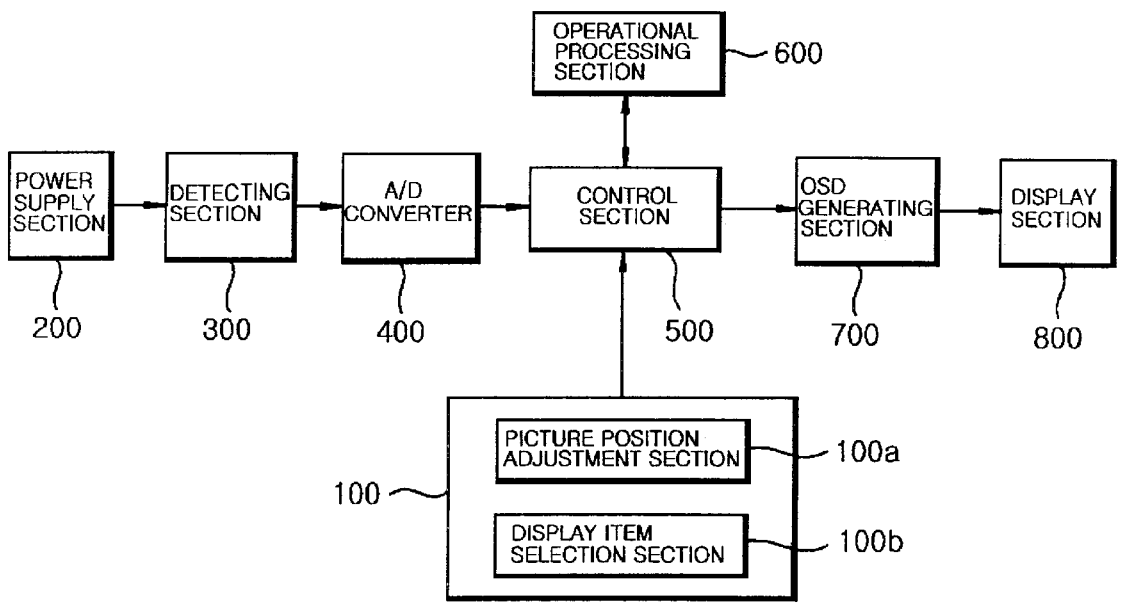
FIG. 1 is a block diagram illustrating the construction of an apparatus for displaying electric power elements for a video display appliance according to the present invention.
Figure 2:
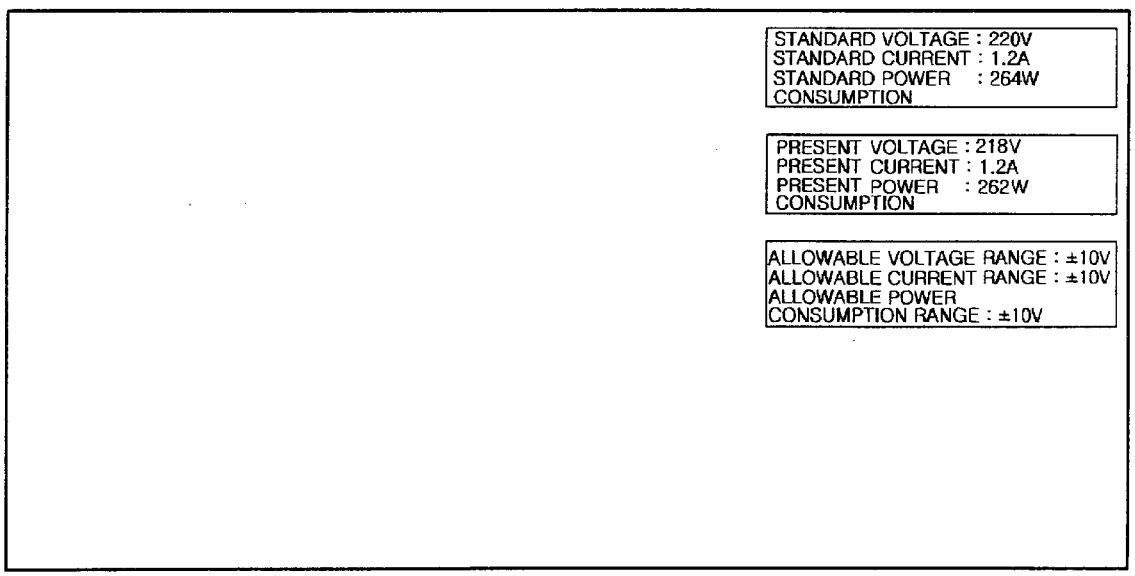
FIG. 2 is a view illustrating an example of a displayed picture of a voltage, current, and power consumption displayed by the display section of FIG. 1.

FIG. 1 is a block diagram illustrating the construction of an apparatus for displaying electric power elements for a video display appliance according to the present invention, and FIG. 2 is a view illustrating an example of a displayed picture of a voltage, current, and power consumption displayed by the display section of FIG. 1. FIG. 3 is a flowchart illustrating a method of displaying electric power elements for a video display appliance according to the present invention.

As shown in FIG. 1, the apparatus for displaying electric power elements for a video display appliance according to the present invention includes a power supply section 200 for supplying the power, a key input section 100 for a user's selection of a display command and display items of the electric power elements, and a detecting section 300 for detecting a voltage and current supplied from the power supply section 200.

The apparatus also includes an analog-to-digital (A/D) converter 400 for converting the voltage and current detected by the detecting section 300 into digital signals, an operational processing section 600 for converting the voltage and current converted by the A/D converter 400 into a power consumption to output the converted voltage, current, and power consumption, a control section 500 for outputting a control signal to the operational processing section 600 so that the voltage and current converted by the A/D converter 400 are converted into the power consumption, an on-screen display (OSD) generating section 700 for processing the power consumption converted by the operational processing section 600 in the form of an OSD to display the power consumption by OSD, and a display section 800 for displaying the power consumption in the form of the OSD outputted from the OSD generating section 700 on a predetermined region of the screen.

Here, the key input section 100 includes a display item selection section 100b for selecting at least one of the display items of the electric power elements, and a picture position adjustment section 100a for adjusting a position of the display items displayed in the form of an OSD on the predetermined region of the display section 800.

The operation of the apparatus for displaying electric power elements for a video display appliance according to the present invention as constructed above will now be explained in detail.

First, when the video display appliance operates normally by turning on the appliance, the detecting section 300 detects the voltage and current actually supplied from the power supply section 200.

Then, the A/D converter converts the voltage and current detected by the detecting section 300 into digital signals.

At this time, the user sets specified display items through the display item selection section 100b of the key input section 100, and then selects the desired display items.

If at least one of the display items is selected by the user through the display item selection section 100b, the control section 500 transmits the voltage and current, which have been converted into the digital signals through the A/D converter 400, to the operational processing section 600.

Here, the operational processing section 600 processes the inputted voltage and current and computes the power consumption according to the control signal from the control section 500.

Then, the control section 500 transmits the power consumption computed by the operational processing section 600 and the display items selected by the display item selection section 100b to the OSD generating section 700 so that the power consumption and the selected display items are displayed on the predetermined region of the display section 800.

The OSD generating section 700 processes the power consumption transmitted from the control section 500 and the display items selected by the user according to the control signal from the control section, and displays them in the form of an OSD on the predetermined region of the display section 800.

FIG. 2 is a view illustrating an example of a displayed picture of the voltage, current, and power consumption displayed by the display section of FIG. 1.

Referring to FIG. 2, the display section 800 receives the present display items processed in the form of an OSD by the OSD generating section 700, and displays them along with the display items in the standard state. Accordingly, the user can compare the electric power elements in the standard state with the electric power elements in the present state. Also, the allowable ranges of the respective electric power elements in which the corresponding video display appliance can perform a normal operation can be set, and displayed along with the electric power element values in the standard state and the electric power element values in the present state, so that the user can judge whether the power supply of the corresponding appliance is in a normal state.

It is also preferable that the display of the electric power elements by the display section 800 may be performed in the form of a graphic. Also, the electric power elements in the present state or in the standard state may be selectively displayed by the selection of the user.

Here, the position of the display items displayed in the form of an OSD on the predetermined region of the display section 800 can be adjusted by the user through the picture position adjustment section 100a of the key input section 100.

Now, the method of displaying electric power elements for a video display appliance according the present invention will be explained with reference to FIG. 3.

First, it is judged whether the user selects the display command and display items of the power elements to be displayed on the screen through the display item selection section 100b of the key input section 100 (step S100).

If it is judged that the user selects the display command and display items through the display item selection section 100b at step S100, the voltage and current detected by the detecting section 300 are processed and computed to match the display items selected by the user (step S200).

Then, the display items according to a result of computing are displayed in the form of an OSD on the predetermined region of the screen. That is, the computed power consumption and the display items selected through the display item selection section 100b are processed in the form of an OSD, and selectively displayed on the screen as shown in FIG. 2 (step S300).

Meanwhile, if it is judged that the user does not select the display command and display items through the display item selection section 100b at step S100, the corresponding display items are not displayed on the display section 800 (step S400).

As described above, according to the present invention, the specified display items selected by the user through the key input section 100 are displayed in the form of an OSD on the predetermined region of the display section 800, and thus the user can conveniently confirm the characteristics and operation state of the corresponding product.

From the foregoing, it will be apparent that the method and apparatus for displaying electric power elements for a video display appliance according to the present invention have the following advantages.

First, the power consumption according to the variation of the voltage and current actually applied to the video display appliance can be computed and displayed in addition to the voltage, current, and power consumption in the standard state of the appliance.

Second, the computed power consumption and the voltage and current presently applied to the video display appliance are selectively displayed along with the electric power elements in the standard state of the corresponding appliance, and thus the characteristics of the corresponding appliance and whether its power supply is in trouble can be more conveniently confirmed.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. An apparatus for displaying electric power elements associated with a particular video display appliance displaying said elements, comprising:

a power supply section for supplying a power to said video display appliance;

a key input section for a user's selection of a display command selecting electric power elements to be displayed;

a detecting section for detecting a voltage and current supplied from the power supply section to said video display appliance;

an analog-to-digital converter for converting the voltage and current detected by the detecting section into digital signals;

an operational processing section for converting the digital signals into a power consumption value in response to a control signal output by a control section;

an on-screen display (OSD) generating section for processing the power consumption value received from the operational processing section to a form suitable for on-screen display; and a display section for displaying the power consumption value in alphanumeric form on a predetermined region of the screen, said value indicating in a textual format at least one of the voltage and current currently being supplied to said video display appliance by the power supply section, and the voltage and current being supplied to said video display appliance in a standard state.

2. The apparatus as claimed in claim 1, wherein the key input section comprises:

a display item selection section for selecting at least one of the display items of the electric power elements; and a picture position adjustment section for adjusting a position of the display items displayed in the form of an OSD on the predetermined region of the display section.

3. The apparatus as claimed in claim 1, wherein the power consumption value displayed includes a word "voltage" with an associated alphanumeric value appearing therewith.

4. The apparatus as claimed in claim 1, wherein the power consumption value displayed includes a word "current" with an associated alphanumeric value appearing therewith.

5. The apparatus as claimed in claim 1, wherein the power consumption value displayed includes a word "power" with an associated alphanumeric value appearing therewith.

6. A method of displaying electric power elements for a video display appliance comprising the steps of:

detecting a voltage and current supplied to the video display appliance;

processing, in response to receiving a user's key input selecting a display command and display items of the electric power element values to be displayed on a screen of said video display appliance, the detected voltage and current to match the display items selected by the user and displaying the display item as an alphanumeric value with associated text according to a result of said processing on a predetermined region of the screen by an on-screen display; and displaying, in an absence of receiving the user's key input, no display item on the screen.

7. The method as claimed in claim 6, wherein the display items are values of the voltage, current, and power consumption of a present state, values of the voltage, current, and power consumption of a standard state, or a combination of said present and standard state values, said values being designated by words "voltage", "current" and "power", respectively.

* * * * *